No. 883,278.
PATENTED MAR. 31, 1908.
J. E. BELT.
ORE SEPARATOR.
APPLICATION FILED MAY 13, 1907.
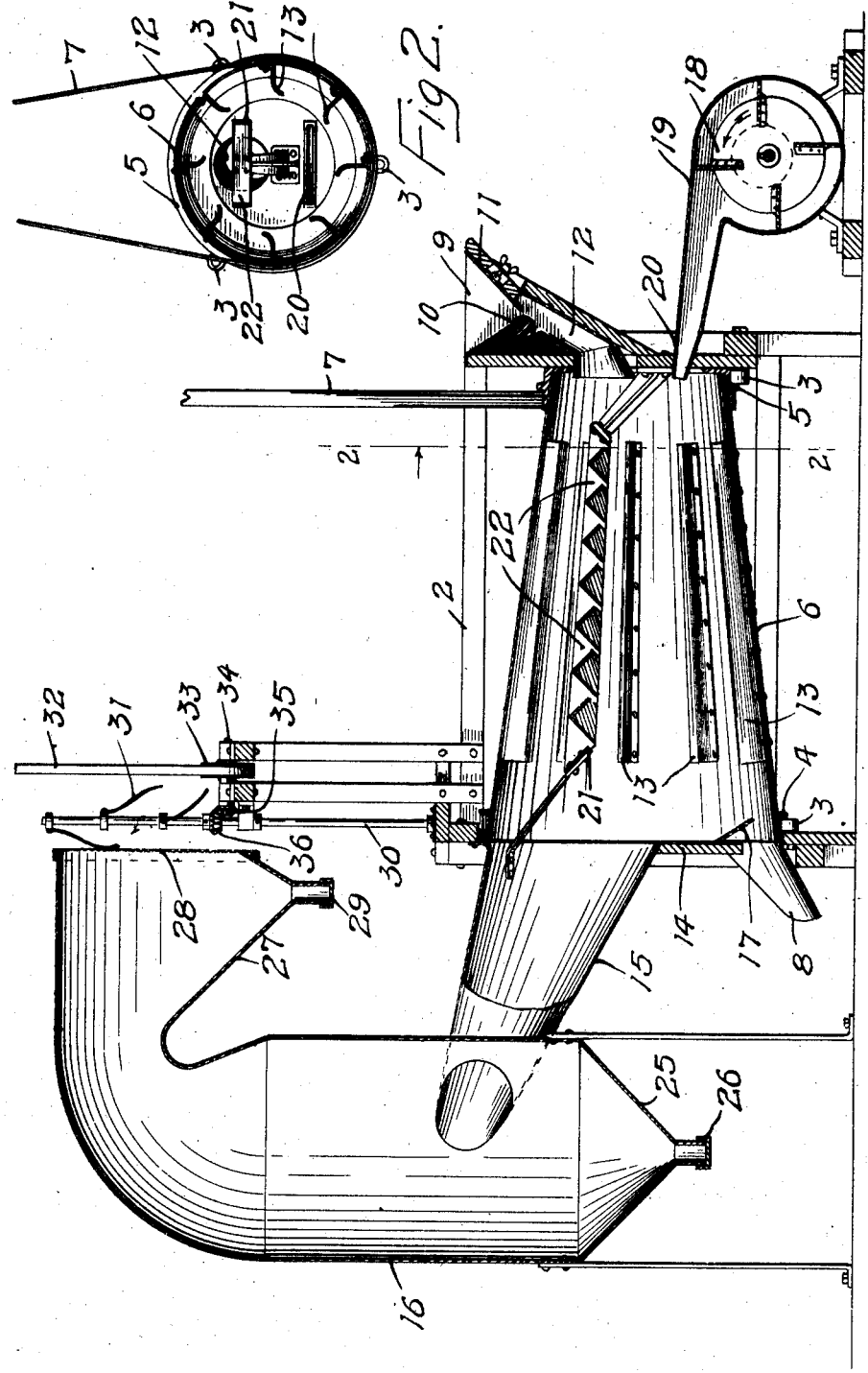
WITNESSES
INVENTOR
JARED E. BELT
BY
HIS ATTORNEYS

UNITED STATES PATENT OFFICE.

JARED E. BELT, OF MINNEAPOLIS, MINNESOTA.

ORE-SEPARATOR.

No. 883,278.  Specification of Letters Patent.  Patented March 31, 1908.

Application filed May 13, 1907. Serial No. 373,492.

*To all whom it may concern:*

Be it known that I, JARED E. BELT, of Minneapolis, county of Hennepin, State of Minnesota, have invented certain Improvements in Ore-Separators, of which the following is a specification.

This invention relates to improvements in ore separators designed especially for removing and cleaning "float gold" and other light particles of precious metal from substances with which they may be mixed, and the object of the invention is to provide a machine by means of which this operation can be extensively and economically carried out and by which all of the float gold, or other light material may be separated and collected.

The invention consists generally in the construction and combinations hereinafter described and particularly pointed out in the claims.

In the accompanying drawings, Figure 1 is a sectional elevation of a machine embodying my invention. Fig. 2 is a transverse vertical section on line 2—2 of Fig. 1.

In the drawings, 2 represents the frame of the machine which may be of any suitable size and construction. Mounted in this frame upon the bearing rolls 3 by ring gudgeons 4 and 5 is a rotatable drum 6. This drum is preferably riveted near its opposite ends to the said ring gudgeons 4 and 5 which rest upon the bearing rolls 3 and said drum is rotated on said rolls by means of a suitable belt 7 passing around the gudgeon 5. The drum has a head in one end through which the feed conductor extends and gradually expands towards its discharge end so that the material fed to the drum will gradually work through the spout 8.

I prefer to provide a hopper 9 having a feed roll 10 and an adjustable gate 11. The material to be separated is directed into this hopper and is fed therefrom by the feed roll 10 and passes downward through the conductor 12 and is delivered into the forward end of the drum. The drum is also preferably provided with a series of buckets 13 extending longitudinally therein. At its rear end the drum is closed by a plate 14 secured to the frame 2 which plate however, is provided with an outlet conductor 15 leading to a settlings chamber 16, hereinafter described. I also prefer to provide a plate 17 partially covering the opening leading into the spout 8. A suitable fan 18 is arranged within a fan-casing 19 and this fan-casing is provided with a discharge nozzle 20 leading into the front end of the drum 6. Supported within the drum, preferably in a horizontal position in the upper part thereof, is a frame 21 carrying a series of hoppers 22. These hoppers are arranged crosswise of the axis of the drum with the discharge opening of the hoppers at an angle so as to cause the material passing from the hoppers to assume an inclined path directed towards the rear end of the drum.

The settlings chamber 16 is provided with a conical lower end 25 having a removable cap 26 and the upper end of this chamber also connects with a second settlings chamber 27 having an open side that is covered by a cloth or other suitable air strainer 28. The chamber 27 is also provided with a removable cap 29. A vertical rotatable shaft 30 is preferably arranged opposite the open side of the chamber 27 and this shaft is provided with a series of flexible beaters 31. The shaft is driven by suitable means, such as a belt 32 engaging the belt wheel 33 upon a short shaft 34 provided with a beveled pinion 35 engaging a similar pinion 36 upon the shaft 30. These beaters are preferably formed of flexible material and they strike sharp, quick blows upon the strainer cloth 28 jarring the light material off from the inner surface thereof and causing it to fall into the lower part of the chamber 27.

Operation: The operation of the machine is as follows: The material to be separated is fed into the forward end of the drum through the hopper 9 and conductor 12. It falls into the lower part of the drum and is carried upward by the buckets 13 and is dropped into the series of hoppers 22. From these hoppers, the material is discharged in thin sheets, directed toward the rear end of the drum and in planes at right angles substantially to the air blast. The thin sheets of material will be subjected to the air blast through each hopper and the light material, such as float gold, will be carried away by the air currents into the settlings chamber 16. The heavier material falls into the bottom of the drum to be again carried upward by the buckets and directed into the succeeding hoppers and this operation is continued throughout the full length of the drum. This drum may be of any required length and any number of hoppers 22 may be employed in connection therewith. The material is thus subjected over and over again to the operation of the blast and the light material is all taken out and carried into the settlings chamber 16. In this chamber the air is quickly exhausted and the material suspended in the air will, in a large degree, fall into the bottom of the chamber 16. The still lighter material will pass over into the chamber 27 and a considerable portion of it will be collected upon the strainer or cloth 28 from which it is removed by the operation of the beaters. When the air enters the chamber 16, it expands to such an extent that in this chamber and the succeeding one it becomes practically dead air and the material carried by it will settle into the bottom of the chamber. While I have shown but a single chamber 16 with a second chamber 27 connected therewith, it will be understood that I may use any number of these chambers, one after another, so as to secure any degree of expansion of air and any required settlement of the light material carried by it in these chambers.

I do not limit myself to the use of this machine for the separating of any particular materials, as the same may be used for the separation of any materials and I wish to be protected in the employment of this invention to all of the uses to which it is applicable.

I do not limit myself to the details of construction, as the same may be varied in many particulars without departing from my invention.

The fan-casing 19 may be arranged to direct a hot air blast through the nozzle 20 and may be connected to exhaust the hot air from a retort or from drying vats. I may thus either introduce a cold air blast into the drum or a hot one, as seems best suitable to produce the desired result.

I claim as my invention:

1. In a separator of the class described, the combination, with a rotatable drum provided with a series of buckets upon its inner surface, of a series of hoppers supported in a stationary position within said drum and adapted to receive the material carried up by said buckets, means for discharging the material in thin sheets from said hoppers, and means for creating a current of air through said drum below said hoppers.

2. In a separator of the class described, the combination, with a rotatable drum provided with a series of buckets upon its inner surface, of a series of hoppers supported in a stationary position within said drum and adapted to receive the material carried up by said buckets, means for discharging the material in thin sheets from said hoppers, said sheets being inclined towards the rear end of said drum, and means for creating a current of air through said drum below said hoppers.

3. In a separator of the class described, the combination with a rotatable drum provided with a series of buckets upon its inner surface, of a series of hoppers supported in a stationary position within said drum and adapted to receive the material carried up by said buckets, means for discharging the material in thin sheets from said hoppers, means for creating a current of air through said drum below said hoppers and suitable settlings chambers into which said air current passes and in which the light material taken up by said air current is deposited.

4. In a separator of the class described, the combination, with a rotatable drum provided with a series of buckets upon its inner surface, of a series of hoppers supported in a stationary position within said drum and adapted to receive the material carried up by said buckets, means for discharging the material in thin sheets from said hoppers, means for creating a current of air through said drum below said hoppers, settlings chambers into which said air current passes, one of said chambers being provided with an open side having a strainer cloth arranged thereon and suitable beaters arranged to engage said cloth, for the purpose set forth.

5. In a separator of the class described, the combination, with a rotatable drum provided with a series of buckets upon its inner surface, of a series of hoppers supported in a stationary position within said drum and adapted to receive the material carried up by said buckets, means for creating a current of air through said drum below said hoppers and means for discharging the material in thin sheets from said hoppers at right angles substantially to the direction of movement of said air current.

In witness whereof, I have hereunto set my hand this 11th day of May, 1907.

JARED E. BELT.

Witnesses:
RICHARD PAUL,
J. B. ERA.